United States Patent
Dimou et al.

(10) Patent No.: US 10,681,605 B2
(45) Date of Patent: Jun. 9, 2020

(54) HANDOVER FOR VIDEO OR OTHER STREAMING SERVICES

(71) Applicant: Telefonaktiebolaget L M Ericsson (publ), Stockholm (SE)

(72) Inventors: Konstantinos Dimou, Stockholm (SE); Walter Müller, Upplands Väsby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 452 days.

(21) Appl. No.: 13/866,070

(22) Filed: Apr. 19, 2013

(65) Prior Publication Data

US 2013/0279474 A1   Oct. 24, 2013

Related U.S. Application Data

(60) Provisional application No. 61/636,341, filed on Apr. 20, 2012.

(51) Int. Cl.
    *H04W 80/04*   (2009.01)
    *H04W 36/16*   (2009.01)
    *H04W 36/00*   (2009.01)

(52) U.S. Cl.
    CPC ........ *H04W 36/16* (2013.01); *H04W 36/0011* (2013.01)

(58) Field of Classification Search
    CPC . H04W 80/04; H04W 36/18; H04W 36/0011; H04W 36/14; H04W 36/08
    See application file for complete search history.

(56) References Cited

U.S. PATENT DOCUMENTS

| | | | | |
|---|---|---|---|---|
| 5,802,283 A | * | 9/1998 | Grady et al. | 709/227 |
| 7,136,395 B2 | * | 11/2006 | Lupien | H04L 69/04 370/349 |

(Continued)

FOREIGN PATENT DOCUMENTS

| | | |
|---|---|---|
| CN | 101461223 A | 6/2009 |
| CN | 101640895 A | 2/2010 |
| WO | 2011043705 A1 | 4/2011 |

OTHER PUBLICATIONS

Nokia, "On Streaming Performance over GERAN A/Gb Mode," 3rd Generation Partnership Project (3GPP), TSG GERAN #14, Apr. 2, 2003, 8 pages.

(Continued)

*Primary Examiner* — Hassan A Phillips
*Assistant Examiner* — Prenell Jones
(74) *Attorney, Agent, or Firm* — Patent Portfolio Builders, PLLC

(57) ABSTRACT

Systems and methods are disclosed for providing optimized handover decisions for mobile devices participating in streaming services. In one embodiment, a serving base station in a cellular communications network obtains a play out buffer size for a streaming service of a mobile device. The serving base station then makes a handover decision based on the play out buffer size for the streaming service of the mobile device. In one embodiment, the streaming service is a downlink streaming service to the mobile device, and the play out buffer size is a size of a downlink play out buffer at the serving base station for the downlink streaming service to the mobile device. In another embodiment, the streaming service is an uplink streaming service from the mobile device, and the play out buffer size is a size of an uplink play out buffer at the mobile device for the uplink streaming service.

19 Claims, 8 Drawing Sheets

(56) References Cited

U.S. PATENT DOCUMENTS

| | | | | |
|---|---|---|---|---|
| 8,547,917 B2* | 10/2013 | Sun | | H04W 72/1242 370/329 |
| 8,954,598 B2* | 2/2015 | Kampmann | | H04L 12/189 370/312 |
| 2003/0235198 A1* | 12/2003 | McElroy | | H04L 49/20 370/395.5 |
| 2004/0005894 A1* | 1/2004 | Trossen | | H04W 36/0011 455/436 |
| 2006/0058056 A1* | 3/2006 | Das et al. | | 455/524 |
| 2006/0187970 A1* | 8/2006 | Lee | | H04L 47/2416 370/516 |
| 2006/0251130 A1* | 11/2006 | Greer | | G10L 21/04 370/508 |
| 2007/0041324 A1* | 2/2007 | Shenoi | | 370/235 |
| 2007/0047515 A1* | 3/2007 | Jonsson | | H04L 49/90 370/352 |
| 2007/0211767 A1* | 9/2007 | Todd et al. | | 370/508 |
| 2007/0280453 A1* | 12/2007 | Kelley | | H04L 67/16 379/201.01 |
| 2008/0026756 A1* | 1/2008 | Harris | | H04W 36/02 455/436 |
| 2008/0095198 A1* | 4/2008 | Wager | | H04L 12/5693 370/519 |
| 2009/0191878 A1* | 7/2009 | Hedqvist | | H04W 36/32 455/441 |
| 2009/0238085 A1* | 9/2009 | Khanduri | | H04L 41/5009 370/252 |
| 2009/0257361 A1* | 10/2009 | Deshpande | | H04L 12/2697 370/252 |
| 2010/0002650 A1* | 1/2010 | Ahluwalia | | 370/331 |
| 2010/0002651 A1* | 1/2010 | Hofmann | | H04W 36/02 370/331 |
| 2010/0067483 A1* | 3/2010 | Ahluwalia | | 370/331 |
| 2010/0135166 A1* | 6/2010 | Ahluwalia | | H04L 47/10 370/252 |
| 2011/0047285 A1* | 2/2011 | Kampmann | | H04L 12/189 709/231 |
| 2011/0207485 A1 | 8/2011 | Dimou et al. | | |
| 2011/0257983 A1* | 10/2011 | Rathonyi et al. | | 704/503 |
| 2012/0044880 A1* | 2/2012 | Sun | | H04W 72/1242 370/329 |
| 2012/0096520 A1* | 4/2012 | Dutta | | H04W 12/06 726/4 |
| 2012/0163342 A1* | 6/2012 | Ahluwalia | | 370/331 |
| 2013/0094472 A1* | 4/2013 | Klingenbrunn et al. | | 370/331 |
| 2013/0322395 A1* | 12/2013 | Kazmi et al. | | 370/329 |
| 2015/0121410 A1* | 4/2015 | Yousaf | | H04N 21/44204 725/21 |
| 2015/0189555 A1* | 7/2015 | Ahluwalia | | H04W 36/02 370/331 |

OTHER PUBLICATIONS

International Search Report and Written Opinion for PCT/IB2013/053117, dated Sep. 6, 2013, 12 pages.
First Office Action and Search Report for Chinese Patent Application No. 201380032398.0, dated Jul. 21, 2017, 17 pages.
Second Office Action for Chinese Patent Application No. 201380032398.0, dated Feb. 23, 2018, 15 pages.
Examination Report for European Patent Application No. 13728831.2, dated Jul. 13, 2018, 5 pages.

* cited by examiner

HANDOVER FOR VIDEO OR OTHER STREAMING SERVICES

RELATED APPLICATIONS

This application claims the benefit of provisional patent application Ser. No. 61/636,341, filed Apr. 20, 2012, the disclosure of which is hereby incorporated herein by reference in its entirety.

FIELD OF THE DISCLOSURE

The present disclosure relates to mobility management in a cellular communications network and more particularly relates to making handover decisions in a cellular communications network.

BACKGROUND

Cellular communications networks utilize handover procedures to accommodate movement of mobile terminals between cells of the cellular communications network while in a connected state. As part of the handover procedure, a network node (e.g., a base station) decides, at an appropriate time, whether to perform a handover of a mobile terminal from one base station to another. In general, handover decisions are made based on a margin hysteresis for signal strength and a time hysteresis. The rationale behind this signal and time hysteresis is to avoid oscillations between neighbor cells; these oscillations are referred to as "ping-pongs." In $3^{rd}$ Generation Partnership Project (3GPP) Long Term Evolution (LTE) cellular communications networks, handover decisions are made based on a handover (HO) hysteresis and a Time to Trigger (TTT) parameter. More specifically, in 3GPP LTE cellular communications networks, a serving base station decides whether to perform a handover for a mobile terminal (i.e., a User Equipment (UE)) from the serving base station to a target base station based on the equation:

$$RSRP_{TARGET} > RSRP_{SERVING} + HO_{HYSTERESIS} + CellOffset,$$

where $RSRP_{TARGET}$ is a Reference Signal Received Power (RSRP) of the target base station measured at the mobile terminal, $RSRP_{SERVING}$ is a RSRP of the serving base station measured at the mobile terminal, $HO_{HYSTERESIS}$ is the handover hysteresis for signal strength, and CellOffset is a cell specific offset. It should be noted that the equation above is a simplified version of the equation which is found within the 3GPP specifications; however, the main content of the equation in the 3GPP specifications is included in the equation above. The serving base station decides that a handover is to be performed to the target base station when the equation above has been satisfied for an amount of time defined by the TTT parameter.

Values for the handover parameters $HO_{HYSTERESIS}$, CellOffset, and TTT are set for an operator of the cellular communications network and are typically the same for all mobile terminals within a given cell. However, the 3GPP LTE standard allows the setting of these handover parameter values on a per mobile terminal basis. For instance, the handover parameter values can be selected upon consideration of a speed of the mobile terminal, a cell size of the serving base station, a direction of movement of the mobile terminal, a cell load of the base station, and/or characteristics of the serving base station. It is also possible to set the handover parameters on the basis of the type of service running on the mobile terminal. Thus, the handover parameters may be set to different values for time critical services (e.g., video or speech) versus best effort services (e.g., web or File Transfer Protocol (FTP)). In this manner, handover decisions can be optimized. However, further optimization of the handover decision is desired in order to further improve the performance of the cellular communications network.

SUMMARY

Systems and methods are disclosed for providing optimized handover decisions for mobile devices participating in streaming services. In one embodiment, a serving base station in a cellular communications network obtains a play out buffer size for a streaming service of a mobile device. The serving base station then makes a handover decision for the mobile device based on the play out buffer size for the streaming service of the mobile device. In one embodiment, the streaming service is a downlink streaming service to the mobile device, and the play out buffer size is a size of a downlink play out buffer at the serving base station for the downlink streaming service to the mobile device. In another embodiment, the streaming service is an uplink streaming service from the mobile device, and the play out buffer size is a size of an uplink play out buffer at the mobile device for the uplink streaming service.

In one embodiment, the serving base station makes the handover decision by determining whether the play out buffer size for the streaming service of the mobile device is greater than a predetermined threshold. If so, the serving base station makes the handover decision for the mobile device based on one or more normal handover parameter values. If the play out buffer size for the streaming service of the mobile device is less than the predetermined threshold, the serving base station makes the handover decision for the mobile device based on one or more aggressive handover parameter values. As used herein, an "aggressive handover parameter value" is a value that is more aggressive (i.e., more favors a handover) than a normal handover parameter value for the corresponding handover parameter. Further, as used herein, a "normal handover parameter value" is a value for the particular handover parameter that would normally be used for the mobile device based on a current context of the mobile device (e.g., a speed of the mobile device, a direction of the mobile device, a cell size of the serving base station, a cell load of the serving base station, and/or other characteristics of the serving base station and/or the mobile device such as number of transmitter and receiver antennas in the serving and neighbor cells) without consideration of the streaming service of the mobile device and without consideration of the play out buffer size of the streaming service of the mobile device.

In another embodiment, the serving base station makes the handover decision by setting a weighting factor for a reference signal received power for a target base station based on the play out buffer size for the streaming service of the mobile device. The serving base station then applies the weighting factor to the reference signal received power for the target base station when making the handover decision for the mobile device.

In yet another embodiment, the serving base station makes the handover decision by setting a cell offset value for the handover decision based on the play out buffer size for the streaming service of the mobile device. The serving base station then makes the handover decision based on the cell offset value.

In one embodiment, a mobile device provides an uplink streaming service via a cellular communications network. The mobile device sends a play out buffer size for the uplink streaming service to a serving base station of the mobile device. In response to sending the play out buffer size to the serving base station, the mobile device receives a handover command from the serving base station to perform a handover from the serving base station to a target base station. The mobile device then performs the handover from the serving base station to the target base station in response to the handover command.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods are disclosed for making handover decisions for mobile devices by either sending or receiving streaming services based on corresponding play out buffer sizes. Thus, in some implementations, the systems and methods disclosed herein allow users with streaming services to enjoy seamless handovers without this penalizing the cellular communications network with a high number of unnecessary handovers. As such, some exemplary and non-limiting benefits of the systems and methods disclosed herein may include reducing signaling overhead and freeing processing resources that might otherwise be wasted on unnecessary handovers.

Figure 1:
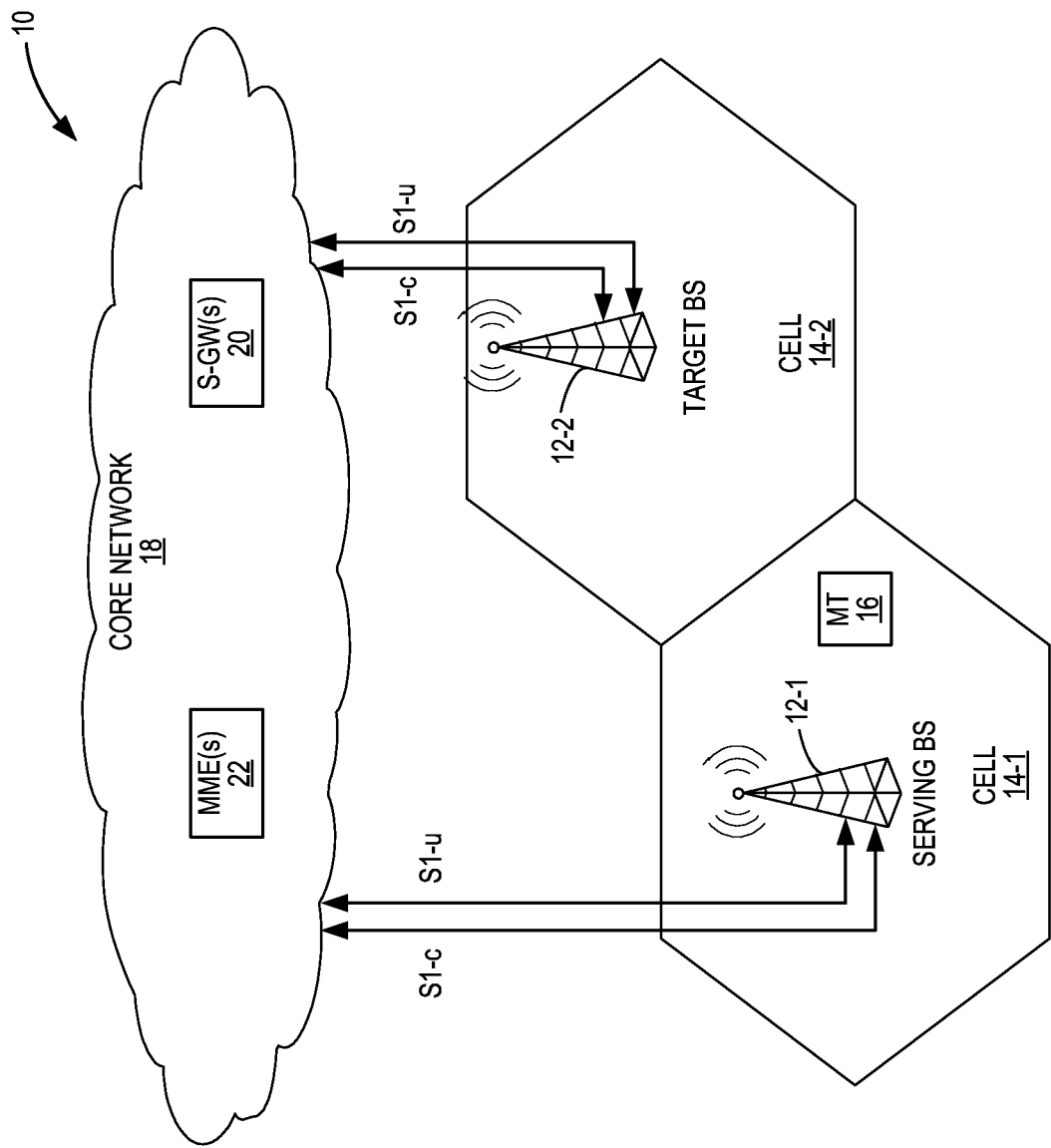
FIG. 1 illustrates a cellular communications network according to one embodiment of the present disclosure.

In this regard, FIG. 1 illustrates a cellular communications network 10 that provides handover decisions according to one embodiment of the present disclosure. In this particular embodiment, the cellular communications network 10 is a $3^{rd}$ Generation Partnership Project (3GPP) Long Term Evolution (LTE) cellular communications network and, as such, some of the terminology used herein may be specific to 3GPP LTE cellular communications networks. However, the present disclosure is not limited to 3GPP LTE cellular communications networks. Rather, the systems and methods disclosed herein may be utilized in any type of cellular communications network.

As illustrated in FIG. 1, the cellular communications network 10 includes a Radio Access Network (RAN), which includes base stations (BSs) 12-1 and 12-2 (more generally referred to herein collectively as base stations 12 and individually as base station 12) that serve mobile devices located in corresponding cells 14-1 and 14-2 (more generally referred to herein collectively as cells 14 and individually as cell 14) of the cellular communications network 10. In this example, the base stations 12-1 and 12-2 are macro base stations (e.g., eNodeBs in a 3GPP LTE cellular communications network). However, one or both of the base stations 12-1 and 12-2 may alternatively be a micro, or low-power, base station (e.g., a femto or pico base station). In this example, the base station 12-1 serves a mobile device 16 located in the cell 14-1 and, as such, the base station 12-1 is referred to herein as a serving base station 12-1 of the mobile device 16. In a similar manner, since the discussion below relates to making a decision on whether to handover the mobile device 16 from the serving base station 12-1 to the base station 12-2, the base station 12-2 is also referred to herein as a target base station 12-2. Notably, while only two base stations 12-1 and 12-2 and one mobile device 16 are illustrated in FIG. 1 for clarity and ease of discussion, it will be readily appreciated that the cellular communications network 10 includes numerous base stations 12 and numerous mobile devices 16. Further, as used herein, a "mobile device" is any type of mobile device having cellular network capabilities. Some examples of a mobile device include, but are not limited to, a mobile terminal such as a mobile phone, a tablet computer equipped with a cellular network interface, or a notebook computer equipped with a cellular network interface; a mobile device or machine that is equipped with a cellular network interface (e.g., a camera that is situated within a vehicle and is equipped with a cellular network interface); or the like.

The cellular communications network 10 also includes a core network 18 that includes one or more Serving Gateways (S-GWs) 20 and one or more Mobility Management Entities (MMEs) 22. In LTE, the base stations 12-1 and 12-2 are connected to the same or different S-GWs 20 via corresponding S1-u connections and connected to the same or different MMEs 22 via corresponding S1-c connections. Similarly, in this embodiment, the base stations 12-1 and 12-2 are connected to one another via an X2 connection. The S-GWs 20 are user plane nodes connecting the core network 18 to the RAN. Among other things, the S-GWs 20 serve as mobility anchors when mobile devices, such as the mobile device 16, move between cells as well as mobility anchors for other 3GPP technologies (e.g., Global System for Mobile Communications (GSM)/General Packet Radio Service (GPRS) and High Speed Packet Access (HSPA)). The MMEs 22 are control plane nodes of the core network 18. The responsibilities of the MMEs 22 include connection/release of bearers to mobile devices, handling of idle to active transitions, and handling of security keys.

As discussed below in detail, the mobile device 16 has either a downlink streaming service or an uplink streaming service. For example, the mobile device 16 may be receiving a downlink audio or video stream (e.g., a video stream from the YouTube® website or a similar Internet-based streaming audio/video content provider). The downlink audio or video stream is referred to herein as a downlink streaming service. In a similar manner, the mobile device 16 may provide an audio or video stream and send the audio or video stream through the cellular communications network 10. For example, the mobile device 16 may generate a video stream for a live video call or chat (e.g., an audio/video stream for a video call via Apple Inc.'s FaceTime® application). The uplink audio and/or video stream is referred to herein as an uplink streaming service. Notably, while much of the discussion herein focuses on a single downlink streaming service or a single uplink streaming service, the mobile device 16 may have multiple downlink streaming services (e.g., a video stream and a separate audio stream) or multiple uplink streaming services (e.g., a video stream and a separate audio stream).

The cellular communications network 10 operates to make a handover decision for the mobile device 16 regarding a handover from the serving base station 12-1 of the mobile device 16 to the target base station 12-2 based on, or upon consideration of, a play out buffer size for the streaming service of the mobile device 16. Using the play out buffer size, the serving base station 12-1 can ensure that a handover is performed quickly in the event that the play out buffer size of the streaming service is small or more slowly in the event that the play out buffer size of the streaming service is large. When the play out buffer size is small, there is a need for the mobile device 16 to closely follow channel variations and hence connect to the base station 12-1 or 12-2 that provides the best channel as soon as possible. As such, a quick, or aggressive, handover is desired when the play out buffer size is small. Conversely, the inventors have found that quick, or aggressive, handovers when the play out buffer size is large results in many unnecessary handovers or ping-pongs. As such, when the play out buffer size is large, it is beneficial for the serving base station 12-1 to make the handover decision less quickly, or less aggressively.

Figure 2:
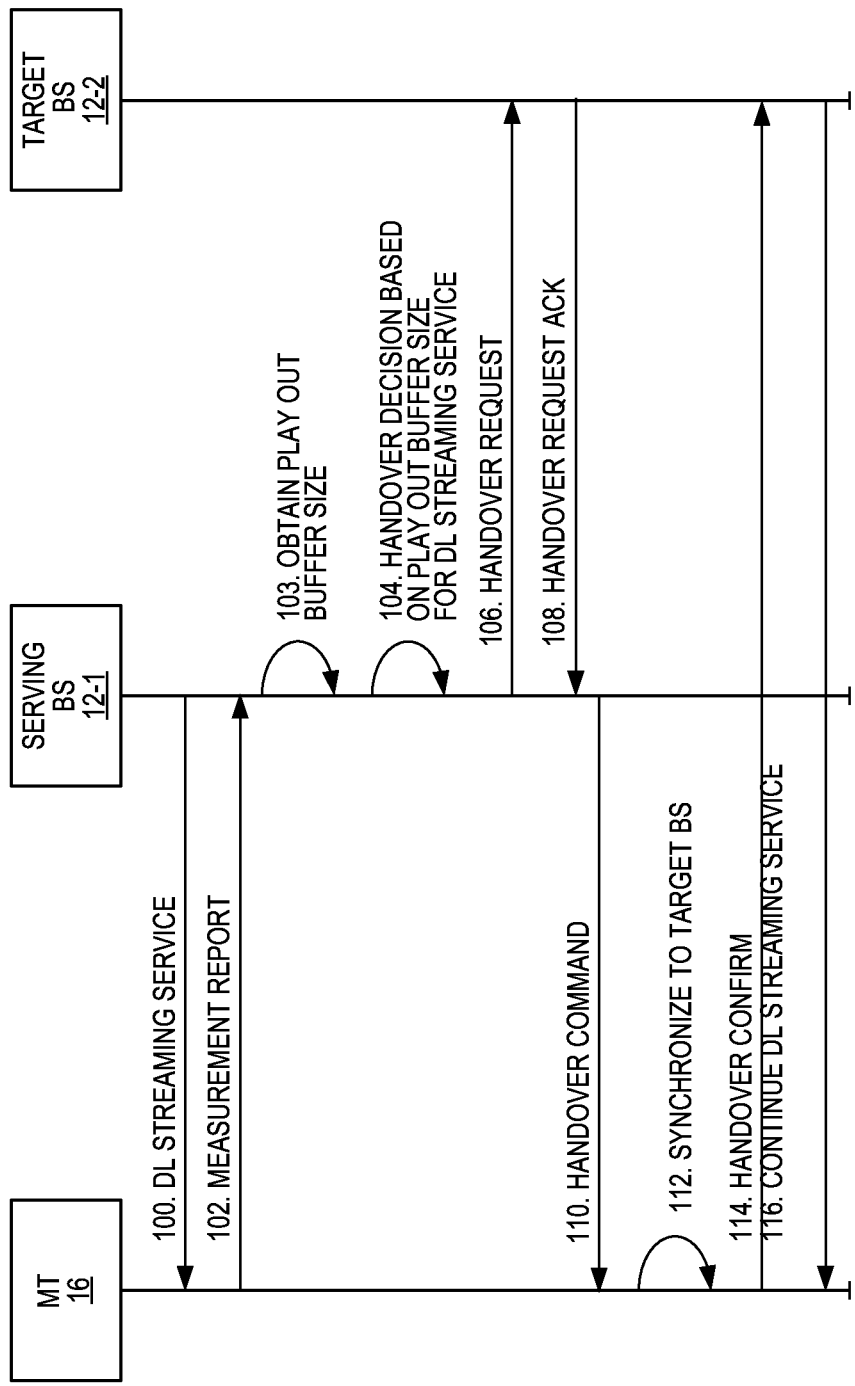
FIG. 2 is a flow diagram that illustrates the operation of the cellular communications network of FIG. 1 to utilize a play out buffer size for a downlink streaming service to a mobile device to make a handover decision for the mobile device according to one embodiment of the present disclosure.

In this regard, FIG. 2 is a flow diagram that illustrates the operation of the cellular communications network 10 to make a handover decision for the mobile device 16 based on a play out buffer size for a downlink streaming service to the mobile device 16 according to one embodiment of the present disclosure. First, a downlink streaming service is provided to the mobile device (MD) 16 via a downlink from the serving base station 12-1 (step 100). The downlink streaming service is generally any type of streaming service. One example is an audio or video stream such as, for instance, a video stream from an Internet based streaming video content provider. At an appropriate time, the mobile device 16 generates and sends a measurement report to the serving base station 12-1 (step 102). The measurement report includes received signal strength measurements to be used for a handover decision by the serving base station 12-1. For 3GPP LTE, the measurement report includes a measured Reference Signal Received Power (RSRP) for reference signals received by the mobile device 16 from both the serving base station 12-1 and the target base station 12-2.

The serving base station 12-1 obtains information indicating a play out buffer size for a streaming service of the mobile device 16 (step 103). In particular embodiments, the serving base station 12-1 may store information regarding a size of one or more play out buffers for downlink streaming services provided by the serving base station 12-1. In such embodiments, the serving base station 12-1 may obtain the play out buffer size for the relevant streaming service by reading the size from memory (e.g., a local memory device installed in or coupled to the serving base station 12-1). In alternative embodiments, the serving base station 12-1 may obtain this information from another element of the cellular communications network 10 responsible for maintaining such information.

Next, the serving base station 12-1 makes a handover decision regarding a handover of the mobile device 16 from the serving base station 12-1 to the target base station 12-2 based on the measurement report and a play out buffer size for the downlink (DL) streaming service to the mobile device 16 (step 104). The play out buffer size is a size of a play out buffer at the serving base station 12-1 for the downlink streaming service to the mobile device 16. The play out buffer includes data for the downlink streaming service that is to be transmitted to the mobile device 16. The play out buffer size may be expressed as an amount of data (e.g., a number of bytes of data) or an amount of playback time that corresponds to the amount of data stored in the play out buffer. Regarding playback time, in addition to the amount of data, the playback time may depend on a quality of the streaming audio or video content, one or more encoding parameters used for the streaming audio or video content, or the like. Note that, in some embodiments, the mobile device 16 may have multiple downlink streaming services. In those embodiments, the play out buffer may be a play out buffer for one of the multiple downlink streaming services to the mobile device 16 where the play out buffer size is a size of that play out buffer. Alternatively, the play out buffer may be a combined play out buffer for the multiple downlink streaming services to the mobile device 16 where the play out buffer size is a size of the combined play out buffer.

In general, aggressive handovers are typically used for time-critical services such as video or speech services. An aggressive handover is a handover that is performed based on aggressive handover parameter values (e.g., a small or negative handover hysteresis for signal strength, a small or negative cell offset value for the cell 14-1 of the serving base station 12-1, and/or a small Time to Trigger (TTT) value). The aggressive handover parameter values result in handovers being performed with very little delay. However, the inventors have found that using aggressive handover parameter values for streaming services is not always optimal. In particular, if the play out buffer size for the downlink streaming service to the mobile device 16 is large, the mobile device 16 can remain in the cell 14-1 for a certain amount of time without this being noticed by a user of the mobile device 16. As such, in step 104, the serving base station 12-1 makes the handover decision based on less aggressive, or normal, handover parameter values if the play out buffer size for the downlink streaming service to the mobile device 16 is greater than or equal to a predetermined threshold. Otherwise, if the play out buffer size is less than the predetermined threshold, the serving base station 12-1 makes the handover decision based on one or more aggressive handover parameter values. The use of less aggressive handover parameter values when the play out buffer size is large reduces the number of unneeded handovers, referred to in the art as "ping-pongs," that result from the use of aggressive handover parameter values.

In this example, the serving base station 12-1 decides that a handover of the mobile device 16 from the serving base station 12-1 to the target base station 12-2 is to be performed. At that point, a handover procedure is performed. The details of the handover procedure may vary based on the type of cellular communications network and the particular configuration of the cellular communications network. In this example, the base stations 12-1 and 12-2 are neighboring base stations having an X2 connection, and the handover is performed between the base stations 12-1 and 12-2 over the X2 connection. More specifically, the serving base station 12-1 sends a handover request to the target base station 12-2 (step 106). Assuming that the target base station 12-2 has capacity to serve the mobile device 16, the target base station 12-2 sends a handover request acknowledgement (ACK) to the serving base station 12-1 (step 108).

In response to the handover request acknowledgement, the serving base station 12-1 sends a handover command to the mobile device 16 (step 110). In 3GPP LTE, the handover command is more specifically a Radio Resource Control (RRC) Reconfiguration Request. The mobile device 16 then synchronizes to the target base station 12-2 and then sends a handover confirm message to the target base station 12-2 (steps 112 and 114). At that point, the handover is complete, and the downlink stream service to the mobile device 16 continues via the base station 12-2, which is now the serving base station of the mobile device 16 (step 116).

Figure 3:
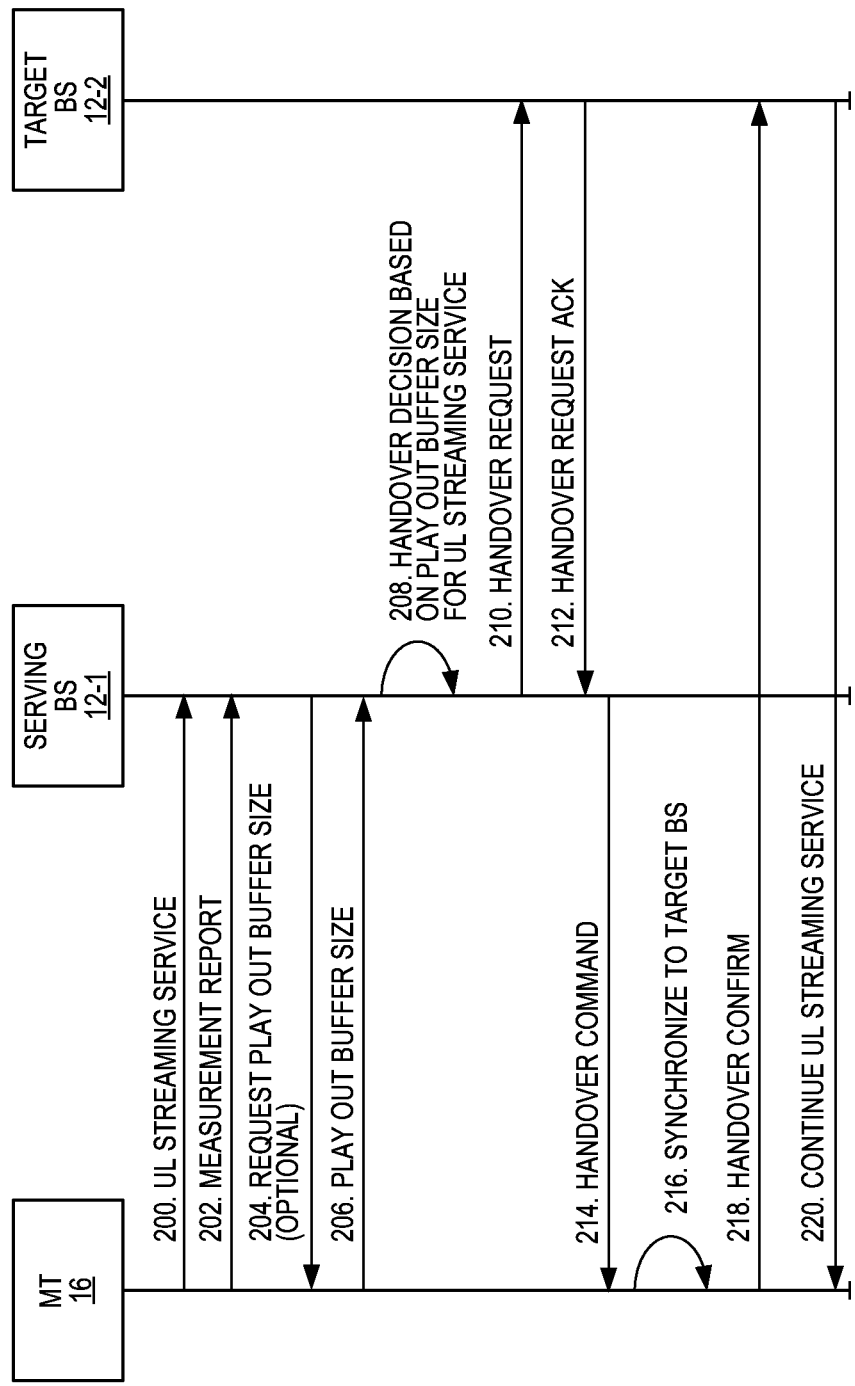
FIG. 3 is a flow diagram that illustrates the operation of the cellular communications network of FIG. 1 to utilize a play out buffer size for an uplink streaming service from a mobile device to make a handover decision for the mobile device according to another embodiment of the present disclosure.

FIG. 3 is a flow diagram that illustrates the operation of the cellular communications network 10 to make a handover decision for the mobile device 16 based on a play out buffer size for an uplink (UL) streaming service from the mobile device 16 according to another embodiment of the present disclosure. First, the mobile device 16 provides an uplink streaming service via an uplink to the serving base station 12-1 (step 200). The uplink streaming service is generally any type of streaming service. One example is an audio or video stream such as, for instance, a video stream for a video call. At an appropriate time, the mobile device 16 generates and sends a measurement report to the serving base station 12-1 (step 202). The measurement report includes received signal strength measurements to be used for a handover decision by the serving base station 12-1. For 3GPP LTE, the measurement report includes a measured RSRP for reference signals received by the mobile device 16 from both the serving base station 12-1 and the target base station 12-2.

Next, the serving base station 12-1 sends an explicit request to the mobile device 16 for a play out buffer size for the uplink streaming service from the mobile device 16 (step 204). Note that step 204 is optional. The play out buffer size for the uplink streaming service is a size of the play out buffer at the mobile device 16 for the uplink streaming service. The play out buffer includes data for the uplink streaming service that is to be transmitted from the mobile device 16 to the serving base station 12-1. The play out buffer size may be expressed as an amount of data (e.g., a number of bytes of data) or an amount of playback time that corresponds to the amount of data stored in the play out buffer. Regarding playback time, in addition to the amount of data, the playback time may depend on a quality of the streaming audio or video content, one or more encoding parameters used for the streaming audio or video content, or the like. Note that, in some embodiments, the mobile device 16 may have multiple uplink streaming services. In those embodiments, the play out buffer may be a play out buffer for one of the multiple uplink streaming services from the mobile device 16 where the play out buffer size is a size of that play out buffer. Alternatively, the play out buffer may be a combined play out buffer for the multiple uplink streaming services to the mobile device 16 where the play out buffer size is a size of the combined play out buffer.

In response to the request or alternatively at some predefined time, the mobile device 16 sends the play out buffer size for the uplink streaming service to the serving base station 12-1 (step 206). Note that the sending, or reporting, of the play out buffer size for the uplink streaming service is to be differentiated from buffer status reports for logical channel groups in 3GPP LTE cellular communications networks. In 3GPP LTE, a logical channel group includes multiple logical channels that are grouped for reporting purposes in order to reduce overhead. A buffer status report for a logical channel group includes a buffer size across all logical channels in the logical channel group. The buffer size for a logical channel group is to be distinguished from the play out buffer size for the uplink streaming service.

Next, the serving base station 12-1 makes a handover decision regarding a handover of the mobile device 16 from the serving base station 12-1 to the target base station 12-2 based on the measurement report and the play out buffer size for the uplink streaming service from the mobile device 16 (step 208). As discussed above, in general, aggressive handovers are typically used for time-critical services such as video or speech services. However, as discussed above, the inventors have found that using aggressive handover parameters for streaming services is not always optimal. In particular, if the play out buffer size for the uplink streaming service from the mobile device 16 is large, the mobile device 16 can remain in the cell 14-1 for a certain amount of time without this being noticed by the user of the mobile device 16. As such, in step 208, the serving base station 12-1 makes the handover decision based on less aggressive, or normal, handover parameter values if the play out buffer size for the uplink streaming service from the mobile device 16 is greater than or equal to a predetermined threshold. Otherwise, if the play out buffer size is less than the predetermined threshold, the serving base station 12-1 makes the handover decision based on one or more aggressive handover parameter values. The use of less aggressive handover parameter values when the play out buffer size is large reduces the number of unneeded handovers, referred to in the art as "ping-pongs," that result from the use of aggressive handover parameter values.

In this example, the serving base station 12-1 decides that a handover of the mobile device 16 from the serving base station 12-1 to the target base station 12-2 is to be performed. At that point, a handover procedure is performed. The details of the handover procedure may vary based on the type of cellular communications network and the particular configuration of the cellular communications network. In this example, the base stations 12-1 and 12-2 are neighboring base stations having an X2 connection, and the handover is performed between the base stations 12-1 and 12-2 over the X2 connection. More specifically, the serving base station 12-1 sends a handover request to the target base station 12-2 (step 210). Assuming that the target base station 12-2 has capacity to serve the mobile device 16, the target base station 12-2 sends a handover request acknowledgement to the serving base station 12-1 (step 212).

In response to the handover request acknowledgement, the serving base station 12-1 sends a handover command to the mobile device 16 (step 214). In 3GPP LTE, the handover command is more specifically a RRC Reconfiguration Request. The mobile device 16 then synchronizes to the target base station 12-2 and then sends a handover confirm message to the target base station 12-2 (steps 216 and 218). At that point, the handover is complete, and the uplink stream service to the mobile device 16 continues via the base station 12-2, which is now the serving base station of the mobile device 16 (step 220). Before proceeding, it should be noted that the handover procedures shown in FIGS. 2 and 3 are intra-MME and intra-S-GW handovers (i.e., the base stations 12-1 and 12-2 are served by the same MME 22 and the same S-GW 20). However, as will be appreciated by one of ordinary skill in the art, the handovers may alternatively be inter-MME and/or inter-S-GW handovers in which case the corresponding MMEs 22 and S-GWs 20 are involved in the handovers.

Figure 4:
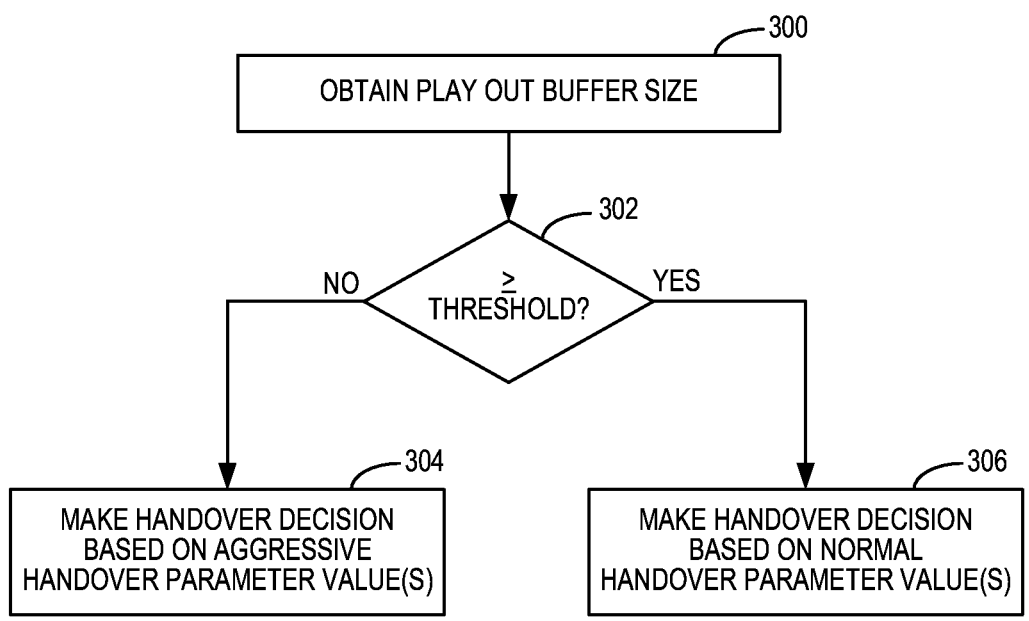
FIG. 4 is a flow chart that illustrates a process for making a handover decision for a mobile device based on a play out buffer size for a streaming service of the mobile device according to one embodiment of the present disclosure.
Figure 5:
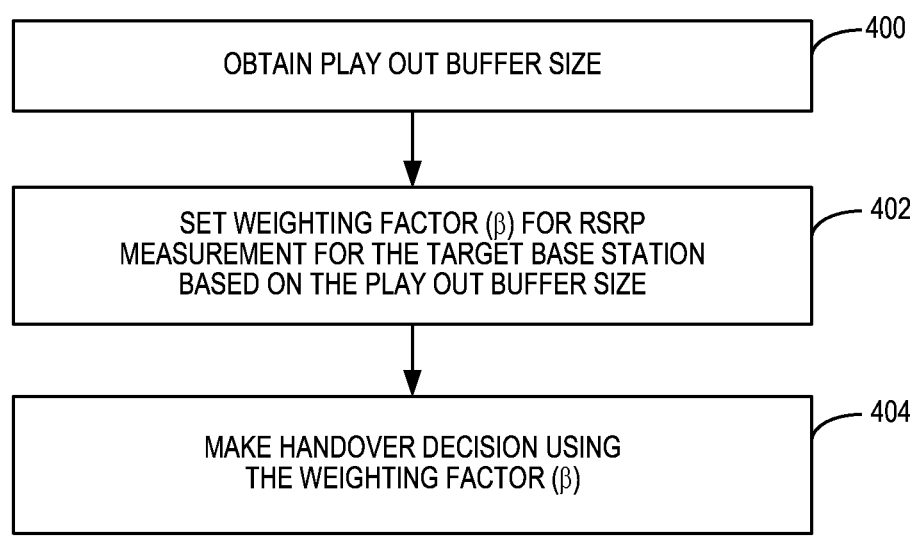
FIG. 5 is a flow chart that illustrates a process for making a handover decision for a mobile device based on a play out buffer size for a streaming service of the mobile device according to another embodiment of the present disclosure.
Figure 6:
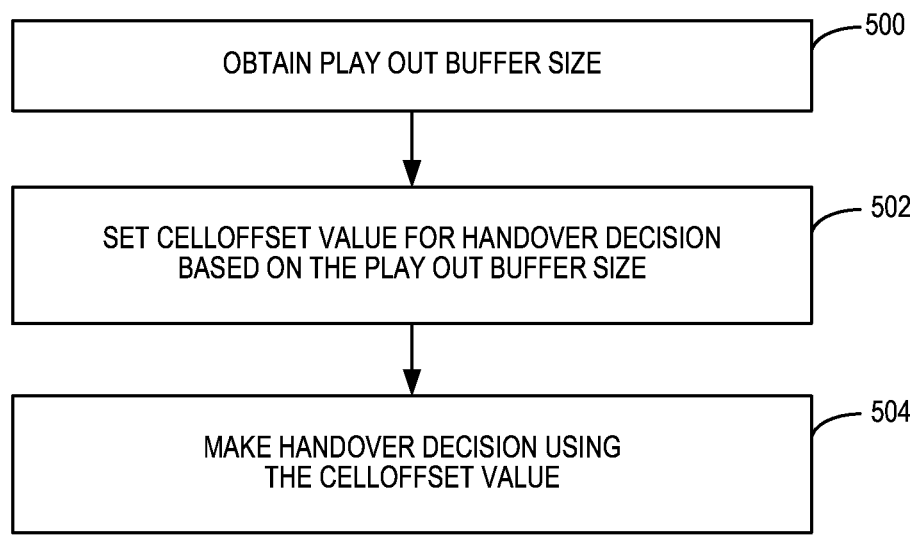
FIG. 6 is a flow chart that illustrates a process for making a handover decision for a mobile device based on a play out buffer size for a streaming service of the mobile device according to another embodiment of the present disclosure.

FIGS. 4 through 6 are flow charts that illustrate the handover decision of steps 104 (FIG. 2) and 208 (FIG. 3) in more detail according to various embodiments of the present disclosure. In particular, FIG. 4 is a flow chart that illustrates a process for making a handover decision according to one embodiment of the present disclosure. First, as discussed above, the serving base station 12-1 obtains the play out buffer size for the streaming service of the mobile device 16 (step 300). The streaming service may be a downlink streaming service as discussed above with respect to FIG. 2 or an uplink streaming service as discussed above with respect to FIG. 3. Next, the serving base station 12-1 determines whether the play out buffer size for the streaming service of the mobile device 16 is greater than or equal to a predetermined threshold (step 302). The predetermined threshold may be a predetermined static value for all handover decisions for mobile devices, such as the mobile device 16, having streaming services. Alternatively, the predetermined threshold may be a predetermined value for a current context of the mobile device 16 (e.g., speed, direction of travel, cell size, and/or the like). As one example, the predetermined threshold value may be a desired value in the range of and including 0 to 500 milliseconds (ms).

If the play out buffer size for the streaming service of the mobile device 16 is less than the predetermined threshold, the serving base station 12-1 makes the handover decision based on one or more aggressive handover parameter values (step 304). As used herein, an "aggressive handover parameter value" is a value that is more aggressive (i.e., more favors a handover) than a normal handover parameter value for the particular handover parameter. Further, as used herein, a "normal handover parameter value" is a value for the particular handover parameter that would normally be used for the mobile device 16 in the cell 14-1 of the serving base station 12-1 in the current context of the mobile device 16 (e.g., a speed of the mobile device 16, a direction of the mobile device 16, a cell size of the cell 14-1 of the serving base station 12-1, a cell load of the serving base station 12-1, and/or other characteristics of the serving base station 12-1 and/or the mobile device 16) without consideration of the streaming service of the mobile device 16 and without consideration of the play out buffer size of the streaming service of the mobile device 16.

More specifically, for 3GPP LTE, the handover decision is based on the equation:

$$RSRP_{TARGET} > RSRP_{SERVING} + HO_{HYSTERESIS} + CellOffset, \quad (1)$$

where $RSRP_{TARGET}$ is a RSRP of the target base station 12-2 measured at the mobile device 16 and contained in the measurement report from the mobile device 16, $RSRP_{SERVING}$ is a RSRP of the serving base station 12-1 measured at the mobile device 16 and contained in the measurement report from the mobile device 16, $HO_{HYSTERESIS}$ is a handover hysteresis for signal strength, and CellOffset is a cell specific offset for the serving base station 12-1. The serving base station 12-1 decides that a handover is to be performed to the target base station 12-2 when Equation (1) has been satisfied for an amount of time defined by a TTT parameter. Thus, in this embodiment, the handover parameters are the parameters $HO_{HYSTERESIS}$, CellOffset, and TTT. In step 304, one or more of the handover parameters $HO_{HYSTERESIS}$, CellOffset, and TTT are set to aggressive handover parameter values for the handover parameters. For instance, an aggressive value for the $HO_{HYSTERESIS}$ parameter is a small, zero, or negative value. Similarly, an aggressive value for the CellOffset parameter is a small, zero, or negative value, and an aggressive value for the TTT parameter is a small or zero value. As an example, normal values for the handover parameters $HO_{HYSTERESIS}$ and TTT for a large city are 1-3 decibels (dB) and 320-960 ms, respectively. Aggressive values for these handover parameters for a large city may be, for example, 0 dB or a negative value for $HO_{HYSTERESIS}$ and 100-300 ms for TTT. Normal values for the CellOffset parameter may be, for example, 1-2 dB, and aggressive values for the CellOffset parameter may be, for example, a value in a range of and including 0 to some negative dB value. Using the aggressive handover parameter value(s), the serving base station 12-1 makes the handover decision in such as manner as to very quickly trigger a handover when the play out buffer size for the streaming service of the mobile device 16 is less than the predetermined threshold (i.e., is small).

Conversely, if the play out buffer size for the streaming service of the mobile device 16 is greater than or equal to the predetermined threshold (i.e. is large), the serving base station 12-1 makes the handover decision based on one or more normal handover parameter values (step 306). Again, the normal handover parameter value(s) is(are) a value(s) for the corresponding handover parameter(s) that would normally be used for the mobile device 16 in the cell 14-1 of the serving base station 12-1 in the current context of the mobile device 16 (e.g., a speed of the mobile device 16, a direction of the mobile device 16, a cell size of the cell 14-1 of the serving base station 12-1, a cell load of the serving base station 12-1, and/or other characteristics of the serving base station 12-1 and/or the mobile device 16) without consideration of the streaming service of the mobile device 16 and without consideration of the play out buffer size of the streaming service of the mobile device 16.

More specifically, for 3GPP LTE, the handover decision is based on Equation (1) above. In this embodiment, the handover parameters are the parameters $HO_{HYSTERESIS}$, CellOffset, and TTT. In step 306, one or more of the handover parameters $HO_{HYSTERESIS}$, CellOffset, and TTT are set to normal handover parameter values for the handover parameters. In general, the normal handover parameter values are less aggressive than the corresponding aggressive handover parameters from step 304. For instance, a normal value for the $HO_{HYSTERESIS}$ parameter is a positive value that is greater than the aggressive value for the $HO_{HYSTERESIS}$ parameter in step 304. Similarly, a normal value for the CellOffset parameter is a positive value that is greater than the aggressive value for the CellOffset parameter in step 304, and an aggressive value for the TTT parameter is a positive value that is greater than the aggressive value for the TTT parameter in step 304. Using the normal handover parameter value(s), the serving base station 12-1 makes the handover decision in such as manner as to less quickly trigger a handover when the play out buffer size for the streaming service of the mobile device 16 is greater than or equal to the predetermined threshold (i.e., is large).

FIG. 5 is a flow chart that illustrates a process for making a handover decision according to another embodiment of the present disclosure. First, as discussed above, the serving base station 12-1 obtains the play out buffer size for the streaming service of the mobile device 16 (step 400). The streaming service may be a downlink streaming service as discussed above with respect to FIG. 2 or an uplink streaming service as discussed above with respect to FIG. 3. Next, the serving base station 12-1 sets a weighting factor (β) for the RSRP measurement at the mobile device 16 for the target base station 12-2 ($RSRP_{TARGET}$) based on the play out buffer size for the streaming service for the mobile device 16 (step 402). The weighting factor (β) is set such that the weighting factor (β) is inversely related to the play out buffer size. As an example, the weighting factor (β) may be set equal to 1 if the play out buffer size is greater than or equal to a predetermined threshold (i.e., is large) and set to 2 if the play out buffer size is less than the predetermined threshold (i.e., is small). As another example, the weighting factor (β) may be a linear function that increases from a lower limit (e.g., 1) to an upper limit (e.g., 10) as the play out buffer size decreases from an upper limit (e.g., 20 ms) to a lower limit (e.g., 0 ms). Note that the examples above are only examples and are not intended to limit the scope of the present disclosure. There are many ways in which the weighting factor (β) can be set such that the weighting factor (β) is inversely related to the play out buffer size, all of which are within the scope of the present disclosure.

Once the weighting factor (β) is set, the serving base station 12-1 makes the handover decision using the weighting factor (β) (step 404). More specifically, for 3GPP LTE, the handover decision is made based on the equation:

$$\beta \cdot RSRP_{TARGET} > RSRP_{SERVING} + HO_{HYSTERESIS} + CellOffset. \quad (2)$$

The serving base station 12-1 decides that a handover is to be performed to the target base station 12-2 when Equation (2) has been satisfied for an amount of time defined by a TTT parameter. Notably, in this embodiment, the handover parameters $HO_{HYSTERESIS}$, CellOffset, and TTT are preferably set to normal handover parameter values for the current context of the mobile device 16.

FIG. 6 is a flow chart that illustrates a process for making a handover decision according to another embodiment of the present disclosure. First, as discussed above, the serving base station 12-1 obtains the play out buffer size for the streaming service of the mobile device 16 (step 500). The streaming service may be a downlink streaming service as discussed above with respect to FIG. 2 or an uplink streaming service as discussed above with respect to FIG. 3. Next, the serving base station 12-1 sets the CellOffset value for the handover decision based on the play out buffer size for the streaming service for the mobile device 16 (step 502). The CellOffset value is set such that the CellOffset value is directly related to the play out buffer size. As an example, the CellOffset value may be a linear function that increases from a lower limit (e.g., —3) to an upper limit (e.g., 3) as the play out buffer size increases from a lower limit (e.g., 0 ms) to an upper limit (e.g., 20 ms). Note that the examples above are only examples and are not intended to limit the scope of the present disclosure. There are many ways in which the CellOffset value can be set such that the CellOffset value is directly related to the play out buffer size, all of which are within the scope of the present disclosure.

Once the CellOffset value is set, the serving base station 12-1 makes the handover decision using the CellOffset value (step 504). More specifically, for 3GPP LTE, the handover decision is made based on the equation:

$$RSRP_{TARGET} > RSRP_{SERVING} + HO_{HYSTERESIS} + CellOffset, \quad (3)$$

where, in this embodiment, CellOffset is the CellOffset value set in step 502. The serving base station 12-1 decides that a handover is to be performed to the target base station 12-2 when Equation (3) has been satisfied for an amount of time defined by a TTT parameter. Notably, in this embodiment, the other handover parameters $HO_{HYSTERESIS}$ and TTT are preferably set to normal handover parameter values for the current context of the mobile device 16. Also, while FIG. 6 sets the CellOffset value, in a similar manner, the $HO_{HYSTERESIS}$ value and/or the TTT value may be set based on the play out buffer size. This can be in addition to or as an alternative to setting the CellOffset value.

Figure 7:
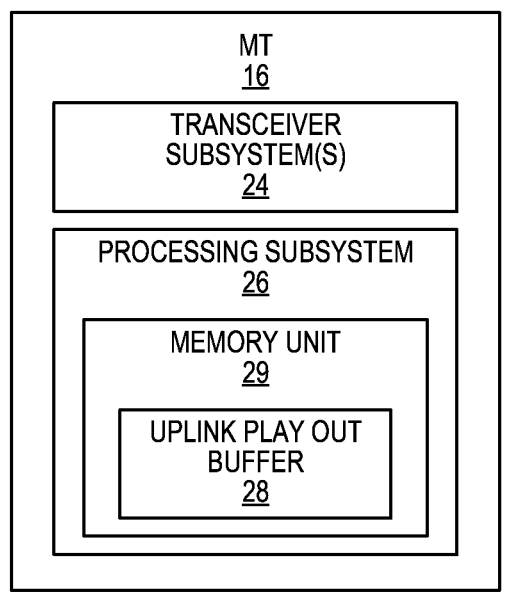
FIG. 7 is a block diagram of the mobile device of FIG. 1 according to one embodiment of the present disclosure.

FIG. 7 is a block diagram of the mobile device 16 of FIG. 1 according to one embodiment of the present disclosure. As illustrated, the mobile device 16 includes one or more transceiver subsystems 24 and a processing subsystem 26. The one or more transceiver subsystems 24 generally include analog and, in some embodiments, digital components for sending and receiving data to and from the base stations 12. In particular embodiments, each of the one or more transceiver subsystems 24 may represent or include one or more Radio Frequency (RF) transceivers, or separate RF transmitter(s) and receiver(s), capable of transmitting suitable information wirelessly to and receiving suitable information from other network components or nodes. From a wireless communications protocol view, the one or more transceiver subsystems 24 implement at least part of Layer 1 (i.e., the Physical or "PHY" Layer).

The processing subsystem 26 generally implements any remaining portion of Layer 1 as well as functions for higher layers in the wireless communications protocol (e.g., Layer 2 (data link layer), Layer 3 (network layer), etc.). In particular embodiments, the processing subsystem 26 may comprise, for example, one or several general-purpose or special-purpose microprocessors or other microcontrollers programmed with suitable software and/or firmware to carry out some or all of the functionality of the mobile device 16 described herein. In addition or alternatively, the processing subsystem 26 may comprise various digital hardware blocks (e.g., one or more Application Specific Integrated Circuits (ASICs), one or more off-the-shelf digital and analog hardware components, or a combination thereof) configured to carry out some or all of the functionality of the mobile device 16 described herein. Additionally, in particular embodiments, the above described functionality of the mobile device 16 may be implemented, in whole or in part, by the processing subsystem 26 executing software or other instructions stored on a non-transitory computer-readable medium, such as Random Access Memory (RAM), Read Only Memory (ROM), a magnetic storage device, an optical storage device, or any other suitable type of data storage components. Of course, the detailed operation for each of the functional protocol layers, and thus the one or more transceiver subsystems 24 and the processing subsystem 26, will vary depending on both the particular implementation as well as the standard or standards supported by the mobile device 16.

Lastly, the mobile device 16 includes, in some embodiments, an uplink play out buffer 28. As discussed above, the uplink play out buffer 28 is utilized to store data to be transmitted to the serving base station 12-1 for an uplink streaming service provided by the mobile device 16. In this embodiment, the uplink play out buffer 28 is implemented as part of the processing subsystem 26. More specifically, the uplink play out buffer 28 is implemented in hardware, software, or a combination thereof. In one particular embodiment, the uplink play out buffer 28 is part of a larger memory unit 29 of the processing subsystem 26 that is allocated for use as the uplink play out buffer 28. In particular embodiments, the memory unit 29 may also store information indicating the size of the uplink play out buffer 28, which may be provided to a serving base station 12 as described above.

Figure 8:
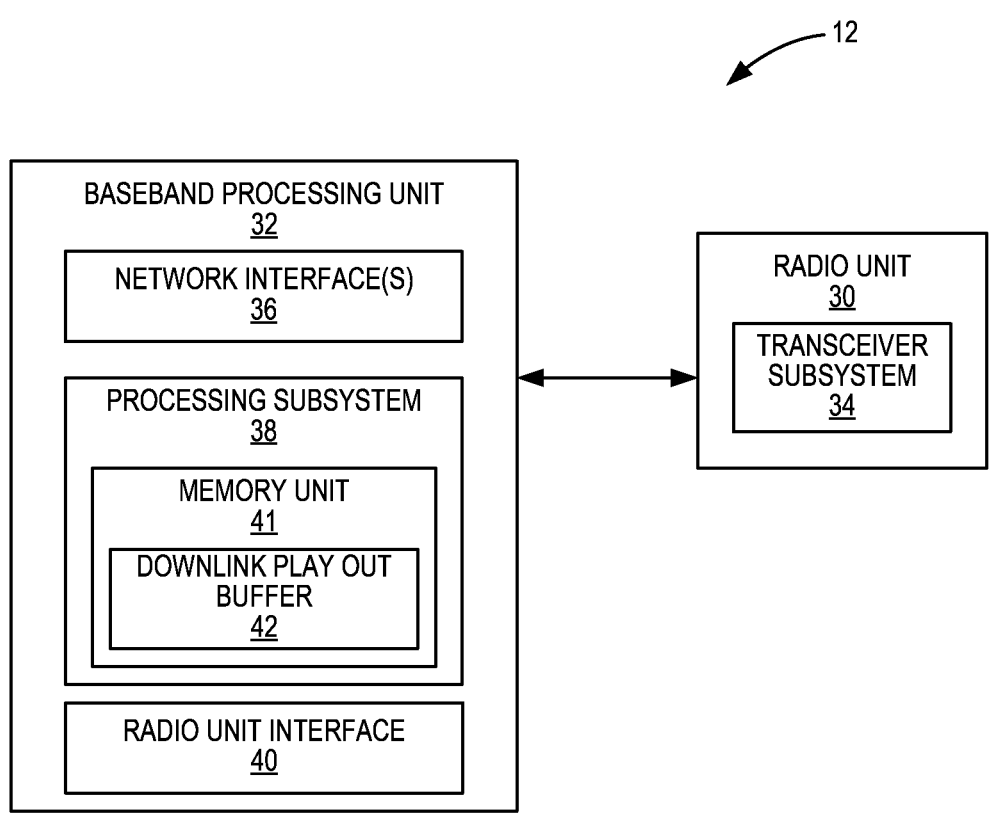
FIG. 8 is a block diagram of one of the base stations of FIG. 1 according to one embodiment of the present disclosure.

FIG. 8 is a block diagram of one of the base stations 12 of FIG. 1 according to one embodiment of the present disclosure. As illustrated, the base station 12 includes a radio unit 30 and a baseband processing unit 32. While only one radio unit 30 is illustrated, the base station 12 may include multiple radio units 30 (e.g., one radio unit 30 per sector). The radio unit 30 generally includes analog and, in some embodiments, digital components for sending and receiving data to and from mobile devices 16 within the corresponding cell 14. In particular embodiments, the radio unit 30 may represent or include one or more RF transceiver(s), or separate RF transmitter(s) and receiver(s), capable of transmitting suitable information wirelessly to and receiving suitable information from other network components or nodes. From a wireless communications protocol view, the radio unit 30 implements at least part of Layer 1 (i.e., the Physical or "PHY" Layer). In particular, the radio unit 30 includes a transceiver subsystem 34 that includes a transmitter and a receiver.

The baseband processing unit 32 includes one or more network interfaces 36, a processing subsystem 38, and a radio unit interface 40. The network interface(s) 36 provide network connectivity to other base stations 12 (e.g., an X2 interface) and network connectivity to a corresponding S-GW 20 and MME 22 (e.g., S1 interfaces). The processing subsystem 38 generally implements any remaining portion of Layer 1 not implemented in the radio unit 30 as well as functions for higher layers in the wireless communications protocol (e.g., Layer 2 (data link layer), Layer 3 (network layer), etc.). In particular embodiments, the processing subsystem 38 may comprise, for example, one or several general-purpose or special-purpose microprocessors or other microcontrollers programmed with suitable software and/or firmware to carry out some or all of the functionality of the base station 12 described herein. In addition or alternatively, the processing subsystem 38 may comprise various digital hardware blocks (e.g., one or more ASICs, one or more off-the-shelf digital and analog hardware components, or a combination thereof) configured to carry out some or all of the functionality of the base station 12 described herein. Additionally, in particular embodiments, the above described functionality of the base station 12 may be implemented, in whole or in part, by the processing subsystem 38 executing software or other instructions stored on a non-transitory computer-readable medium, such as RAM, ROM, a magnetic storage device, an optical storage device, or any other suitable type of data storage components.

In some embodiments, the base station 12 includes a downlink play out buffer 42. As discussed above, the downlink play out buffer 42 is utilized to store data to be transmitted to the mobile device 16 for a downlink streaming service of the mobile device 16. If the base station 12 provides more than one downlink streaming service or downlink streaming services for more than one mobile device 16, the downlink play out buffer 42 may represent one of multiple downlink play out buffers or, alternatively, may represent a combined downlink play out buffer supporting all of the streaming services and/or served mobile devices 16.

In this embodiment, the downlink play out buffer 42 is implemented as part of the processing subsystem 38. More specifically, the downlink play out buffer 42 is implemented in hardware, software, or a combination thereof. In one particular embodiment, the downlink play out buffer 42 is part of a larger memory unit 41 of the processing subsystem 38 that is allocated for use as the downlink play out buffer 42. In particular embodiments, the memory unit 41 may additionally be used to store information regarding a size of one or more downlink play out buffers (e.g., the downlink play out buffer 42) supported by the base station 12. While FIG. 8 specifically illustrates an example embodiment in which the base station 12 is configured to provide a downlink streaming service, alternative embodiments of the base station 12 may only be configured to support an uplink streaming service. In such embodiments, the memory unit 41 of the base station 12 may not include a downlink play out buffer and instead may be used to store information received from one or more mobile devices 16 regarding a respective size of an uplink play out buffer maintained by the relevant mobile devices 16. In general, the memory unit 41 may be configured to provide storage space for one or more downlink play out buffers (such as the downlink play out buffer 42) and/or to store size information for downlink and/or uplink play out buffers, handoff parameters, and/or any other information used by the base station 12 during operation.

The base station 12 includes the radio unit interface 40. The radio unit interface 40 provides an interface between the baseband processing unit 32 and the radio unit 30. It should be noted that, of course, the detailed operation of the network interface(s) 36, the processing subsystem 38, and the radio unit interface 40 may vary depending on both the particular implementation as well as the standard or standards supported by the base station 12.

The following acronyms are used throughout this disclosure.

3GPP 3$^{rd}$ Generation Partnership Project
ACK Acknowledgement
ASIC Application Specific Integrated Circuit
BS Base Station
dB Decibel
DL Downlink
FTP File Transfer Protocol
GPRS General Packet Radio Service
GSM Global System for Mobile Communications
HO Handover
HSPA High Speed Packet Access
LTE Long Term Evolution
MME Mobility Management Entity ms Milliseconds
MD Mobile Device
RAM Random Access Memory
RAN Radio Access Network
RF Radio Frequency
ROM Read Only Memory
RRC Radio Resource Control
RSRP Reference Signal Received Power
S-GW Serving Gateway
TTT Time to Transfer
UE User Equipment
UL Uplink Those skilled in the art will recognize improvements and modifications to the preferred embodiments of the present disclosure. All such improvements and modifications are considered within the scope of the concepts disclosed herein and the claims that follow.

What is claimed is:

1. A method of operation of a base station in a cellular communications network, the method comprising:
   obtaining a play out buffer size at the base station in the cellular communications network for a streaming service of a mobile device; and
   making a handover decision at the base station for the mobile device based on the play out buffer size for the streaming service of the mobile device, wherein the handover decision comprises a decision as to whether to perform a handover of the mobile device, wherein the handover of the mobile device comprises changing a connection of the mobile device from the base station to another base station in the cellular communication network, and wherein making the handover decision comprises:
      setting a handover related parameter to a first value if the play out buffer size is less than a predetermined threshold; and
      setting the handover related parameter to a second value if the play out buffer size is greater than the predetermined threshold, wherein handover is less likely when the handover related parameter is set to the first value than when the handover related parameter is set to the second value.

2. The method of claim 1, wherein the streaming service of the mobile device is a downlink streaming service to the mobile device, and the play out buffer size is a size of a downlink play out buffer at the base station for the downlink streaming service to the mobile device.

3. The method of claim 2, wherein obtaining the play out buffer size comprises reading the size of the downlink play out buffer from memory.

4. The method of claim 3, wherein the play out buffer size is a number of bytes of data stored in the downlink play out buffer.

5. The method of claim 3, wherein the play out buffer size is an amount of time that corresponds to a playback length of data stored in the downlink play out buffer.

6. The method of claim 1, wherein the streaming service of the mobile device is an uplink streaming service from the mobile device, and the play out buffer size is a size of an uplink play out buffer at the mobile device for the uplink streaming service from the mobile device.

7. The method of claim 6, wherein obtaining the play out buffer size comprises receiving the size of the uplink play out buffer from the mobile device.

8. The method of claim 7, wherein the size of the uplink play out buffer is a number of bytes of data stored in the uplink play out buffer.

9. The method of claim 7, wherein the size of the uplink play out buffer is an amount of time that corresponds to a playback length of data stored in the uplink play out buffer.

10. The method of claim 7, further comprising:
    sending a request for the size of the uplink play out buffer to the mobile device,
    wherein receiving the size of the uplink play out buffer from the mobile device is in response to the request.

11. The method of claim 1, wherein making the handover decision comprises:
    upon determining that the play out buffer size for the streaming service of the mobile device is greater than the predetermined threshold, making the handover decision for the mobile device based on a first handover parameter value; and
    upon determining that the play out buffer size for the streaming service of the mobile device is less than or equal to the predetermined threshold, making the handover decision for the mobile device based on a second handover parameter value;
    wherein the second handover parameter value more favors a handover than the first handover parameter value.

12. The method of claim 1, wherein making the handover decision comprises:
    setting a weighting factor for a reference signal received power for a target base station based on the play out buffer size; and
    making the handover decision for the mobile device based on the weighting factor for the reference signal received power for the target base station.

13. The method of claim 12, wherein setting the weighting factor comprises setting the weighting factor for the reference signal received power for the target base station such that the weighting factor is inversely related to the play out buffer size.

14. The method of claim 1, wherein making the handover decision comprises:
    setting a cell offset value for the handover decision based on the play out buffer size; and
    making the handover decision for the mobile device based on the cell offset value.

15. The method of claim 14, wherein setting the cell offset value comprises setting the cell offset value for the handover decision such that the cell offset value is directly related to the play out buffer size.

16. A base station in a cellular communications network, the base station comprising:
    one or more radio units; and
    a processing unit associated with the one or more radio units configured to:
       obtain a play out buffer size at the base station in the cellular communications network for a streaming service of a mobile device served by the base station via the one or more radio units; and
       make a handover decision at the base station for the mobile device based on the play out buffer size for the streaming service of the mobile device, wherein the handover decision comprises a decision as to whether to perform a handover of the mobile device, wherein the handover of the mobile device comprises changing a connection of the mobile device from the base station to another base station in the cellular communication network, and wherein, when making the handover decision, the processing unit is further configured to:

set a handover related parameter to a first value if the play out buffer size is less than a predetermined threshold; and set the handover related parameter to a second value if the play out buffer size is greater than the predetermined threshold, wherein handover is less likely when the handover related parameter is set to the first value than when the handover related parameter is set to the second value.

17. A method of operation of a mobile device in a cellular communications network, the method comprising:

providing an uplink streaming service;

sending a play out buffer size of the mobile device for the uplink streaming service to a serving base station of the mobile device in the cellular communications network;

in response to sending the play out buffer size of the mobile device, receiving a handover command from the serving base station to perform a handover from the serving base station to a target base station in the cellular communications network; and performing the handover from the serving base station to the target base station in response to the handover command.

18. The method of claim 17, further comprising:

receiving an explicit request from the serving base station for the play out buffer size of the mobile device for the uplink streaming service;

wherein sending the play out buffer size of the mobile device for the uplink streaming service to the serving base station is in response to receiving the explicit request.

19. A mobile device for use in a cellular communications network, the method comprising:

a transceiver subsystem; and a processing subsystem associated with the transceiver subsystem configured to:

provide an uplink streaming service via the transceiver subsystem;

send a play out buffer size of the mobile device for the uplink streaming service to a serving base station of the mobile device in the cellular communications network;

receive a handover command from the serving base station to perform a handover from the serving base station to a target base station in the cellular communications network in response to sending the play out buffer size of the mobile device; and perform the handover from the serving base station to the target base station in response to the handover command.

* * * * *